(12) United States Patent
Brunnett et al.

(10) Patent No.: US 7,154,690 B1
(45) Date of Patent: Dec. 26, 2006

(54) DYNAMIC SHOCK DETECTION IN DISK DRIVE USING ACCUMULATED AVERAGE POSITION ERROR

(75) Inventors: Don Brunnett, Pleasanton, CA (US); John Purkett, Longmont, CO (US); Bruce Liikanen, Berthoud, CO (US)

(73) Assignee: Maxtor Corporation, Longmont, CO (US)

( * ) Notice: Subject to any disclaimer, the term of this patent is extended or adjusted under 35 U.S.C. 154(b) by 4 days.

(21) Appl. No.: 11/110,097

(22) Filed: Apr. 19, 2005

Related U.S. Application Data (62) Division of application No. 09/639,567, filed on Aug. 15, 2000, now Pat. No. 6,882,489.

(51) Int. Cl.
*G11B 19/04* (2006.01)

(52) U.S. Cl. .................. 360/60; 360/75; 360/77.08

(58) Field of Classification Search .............. 360/60
See application file for complete search history.

(56) References Cited

U.S. PATENT DOCUMENTS

| | | | | |
|---|---|---|---|---|
| 5,004,207 | A * | 4/1991 | Ishikawa et al. ............ 248/632 |
| 5,126,895 | A * | 6/1992 | Yasuda et al. ............ 360/77.07 |
| 5,153,789 | A * | 10/1992 | Bernett et al. ............ 360/78.04 |
| 5,227,929 | A * | 7/1993 | Comerford ................. 360/75 |
| 5,235,472 | A * | 8/1993 | Smith ......................... 360/60 |
| 5,333,138 | A * | 7/1994 | Richards et al. ............. 360/75 |
| 5,389,850 | A * | 2/1995 | Wilmer ..................... 310/329 |
| 5,392,290 | A * | 2/1995 | Brown et al. ................. 714/6 |
| 5,426,545 | A * | 6/1995 | Sidman et al. ........... 360/78.09 |
| 5,491,394 | A * | 2/1996 | Harwood et al. ........... 318/563 |
| 5,491,676 | A * | 2/1996 | Yamaguchi et al. ...... 369/44.28 |
| 5,576,909 | A * | 11/1996 | Dierkes et al. .......... 360/78.09 |
| 5,696,645 | A * | 12/1997 | Laughlin ..................... 360/75 |
| 5,710,943 | A * | 1/1998 | Burton et al. ................ 710/52 |
| 5,777,815 | A * | 7/1998 | Kasiraj et al. ................ 360/75 |
| 5,923,487 | A * | 7/1999 | Carlson et al. ............... 360/60 |
| 6,115,200 | A * | 9/2000 | Allen et al. .................. 360/60 |
| 6,178,058 | B1 * | 1/2001 | Pan et al. .................... 360/60 |
| 6,313,964 | B1 * | 11/2001 | Lamberts et al. ............ 360/75 |
| 6,429,990 | B1 * | 8/2002 | Serrano et al. ............... 360/60 |
| 6,754,021 | B1 * | 6/2004 | Kisaka et al. ................ 360/60 |
| 2002/0030915 | A1 * | 3/2002 | Nishida et al. .............. 360/60 |

FOREIGN PATENT DOCUMENTS

WO   WO 94/11874   * 5/1994

\* cited by examiner

*Primary Examiner*—Andrea L. Wellington
*Assistant Examiner*—Dan I Davidson
(74) *Attorney, Agent, or Firm*—Tejpal S. Hansra (57) ABSTRACT

Dynamically detecting off-track errors in a disk drive by adjusting transducer head position control parameters in response to shock events. In an embodiment, shock events with large magnitude trigger a severe shock timer which lengthens the write fault before write operations resume. In another embodiment, a lower shock threshold is used following an initial shock event. In yet another embodiment, a lower shock threshold is used if an accumulated average position error of the transducer head is large.

50 Claims, 7 Drawing Sheets

DYNAMIC SHOCK DETECTION IN DISK DRIVE USING ACCUMULATED AVERAGE POSITION ERROR

CROSS-REFERENCE TO RELATED APPLICATION

This application is a divisional of U.S. application Ser. No. 09/639,567 filed Aug. 15, 2000 now U.S. Pat. No. 6,882,489 which is incorporated by reference in its entirety.

FIELD OF THE INVENTION

The present invention relates to positioning and control of disk drive transducer heads. In particular, the present invention relates to protecting against track misregistration errors when the transducer head is off-track.

BACKGROUND OF THE INVENTION

Disk drives store information on magnetic disks. Typically, the information is stored in concentric data tracks on the disks. The tracks are usually divided into sectors. Information is written to and read from the disk by a transducer head. The transducer head may include a read head separate from a write head, or the read and write heads may be integrated. The transducer head is mounted on an actuator arm assembly that moves the transducer head radially over the disk. Accordingly, the movement of the actuator arm assembly allows the transducer head to access different tracks. The disk is rotated by a spindle motor at a high speed, allowing the transducer head to access different sectors within each track on the disk.

The actuator arm assembly is interconnected to a motor, such as a voice coil motor, to move the transducer head radially over the disk. The voice coil motor is controlled by a servo control system. The servo control system performs two functions: seeking and track-following. The seek function moves the transducer head from an initial position to a target track. The seek function is initiated when a host computer associated with the disk drive issues a command to read data from or write data to the target track. Because of increasingly high demands on the performance of computer storage devices such as disk drives, it is desirable to move the transducer head from its initial position to the target track as quickly as possible. Once the transducer head is sufficiently close to the target track, the track-following function is activated to center and maintain the transducer head on the target track until the desired data transfer is complete.

The transducer head will oscillate about the centerline of the target track for a time period following the transition from the seek mode to the track-following mode. Because data written while the transducer head is oscillating about the centerline of the target track may be unrecoverable during subsequent attempts to read the data, the write operations are prohibited for a time period following the transition from the seek mode to the track-following mode. In addition, because data from adjacent tracks may be inadvertently be read, or may corrupt the read signal generated by the transducer head during a read operation attempted while the transducer head is oscillating, the read operations are also inhibited for a time period following the transition from the seek mode to the track-following mode. Settle time during which reading and writing by the transducer head is not allowed better ensures the integrity of data written to or read from the disk.

Disk drives are susceptible to data errors due to external shock events. This is because shock can cause the transducer head to deviate from a desired position over the centerline of a track. Therefore, it is important to prohibit the transfer of data to and from the disk during shock events. In particular, it is important to prohibit writing data to the disk when shock events occur to prevent unrecoverable errors when the data is written to unintended areas of the disk.

The "centerline" of the track does not necessarily coincide with the physical centerline of the track. Instead, the "centerline" may refer to the center of the intended data storage area of the track. Therefore, as used herein, the "centerline" of a track need not refer to the physical centerline of the track, and "centered" indicates that the transducer head is properly centered over the area within the track that is intended for data storage, regardless of whether that position coincides with the physical centerline of the track.

Track misregistration error occurs when the transducer head is not properly centered over the track. Read track misregistration error occurs when the read head of the transducer head is not properly centered over the track centerline. Likewise, write track misregistration error occurs when the write head of the transducer head is not properly centered over the track centerline. Write track misregistration errors are particularly troublesome because they can result in permanent data loss. For instance, data written while the write head is not centered over the track may be unrecoverable during subsequent read operations because the read head, traveling over the track centerline and looking for the data in the expected position, may not be able to retrieve the data written off-center. In addition, data written to adjacent tracks may be lost since data written off-center may overwrite or corrupt data in an adjacent track. Thus, it is important to detect shock events and prohibit writing while the transducer head is not properly centered over the target track.

A write fault occurs when the transducer head deviates a predetermined distance from the centerline of the target track and the servo control system is in the track-following mode. The disk drive may trigger a write fault in response to a shock event and maintain the write fault for a predetermined time period to allow oscillations caused by the shock event to dampen and disappear. While the write fault is in effect, the write operations are disabled.

In setting the distance that the transducer head must deviate from the track centerline (the magnitude of the tracking error) to trigger the write fault, and in setting the time during which the write operations are prohibited, consideration must be given to the data transfer rate of the disk drive. Delaying the write operations avoids track misregistration errors but also reduces the data transfer rate. Although the data transfer rate is of great concern, the integrity of the data is of paramount importance.

Previous methods of detecting shock events and triggering write faults use accelerometers and other devices that are not required for the basic functions of the disk drive. Accordingly, previous shock detection methods increase the cost of the disk drive. In addition, previous shock detection methods treat all shock events equally, regardless of the severity of the shock event, and therefore unnecessarily compromise the data transfer rate and data loss resistance of the disk drive.

It would be advantageous to provide a disk drive that reacts to shock events in different ways, depending on the severity of a particular shock event. In addition, it would be advantageous to provide a disk drive that registers the severity of shock events without a separate shock detector.

Furthermore, it would be advantageous to provide a disk drive that protects against track misregistration errors without unduly limiting the data transfer rate.

SUMMARY OF THE INVENTION

The present invention dynamically alters transducer head position control parameters of a disk drive in response to shock events.

In one embodiment, the position error of the transducer head with respect to a target track is monitored, and where a large deviation from the centerline of the target track is observed, a severe shock is inferred and a severe shock timer is activated and enables a write fault to prohibit write operations while it is running. The severe shock timer supplements a normal shock timer triggered by smaller shock events. The severe shock timer also has a much longer running time than the normal shock timer. The long running time allows oscillations or ringing in the disk drive to dampen and disappear before the write operations are attempted again. In addition, because the ringing following a severe shock event has a relatively low frequency, the long delay introduced by the severe shock timer prevents the disk drive from repeatedly cycling between an off-track state in which writing is prohibited due to the normal shock timer and an on-track state which may be entered as the transducer head passes through the track centerline.

In another embodiment, shock events following an initial shock event more easily trigger a write fault. In response to a shock event, the shock threshold is lowered for a predetermined time period. Because shock events commonly occur in closely spaced intervals, the disk drive quickly responds to subsequent small shock events to better protect against track misregistration errors.

In another embodiment, if an accumulated average transducer head position error is large then the shock threshold is lowered. For example, if the transducer head is persistently traveling to one side of the track centerline, then the position error of the transducer head required to trigger a write fault is reduced since the transducer head is more vulnerable to being knocked out of position and corrupting data in the adjacent tracks due to a shock event.

Advantageously, the disk drive protects against track misregistration errors as appropriate at a given time while maintaining a high data transfer rate. When observed conditions indicate that track misregistration error is imminent, protection against track misregistration errors is increased. Otherwise, more relaxed protection against track misregistration errors is employed to increase the data transfer rate.

Additional objects, features and advantages of the present invention will become readily apparent from the following discussion, particularly when taken together with the accompanying drawings.

DETAILED DESCRIPTION

Figure 1:
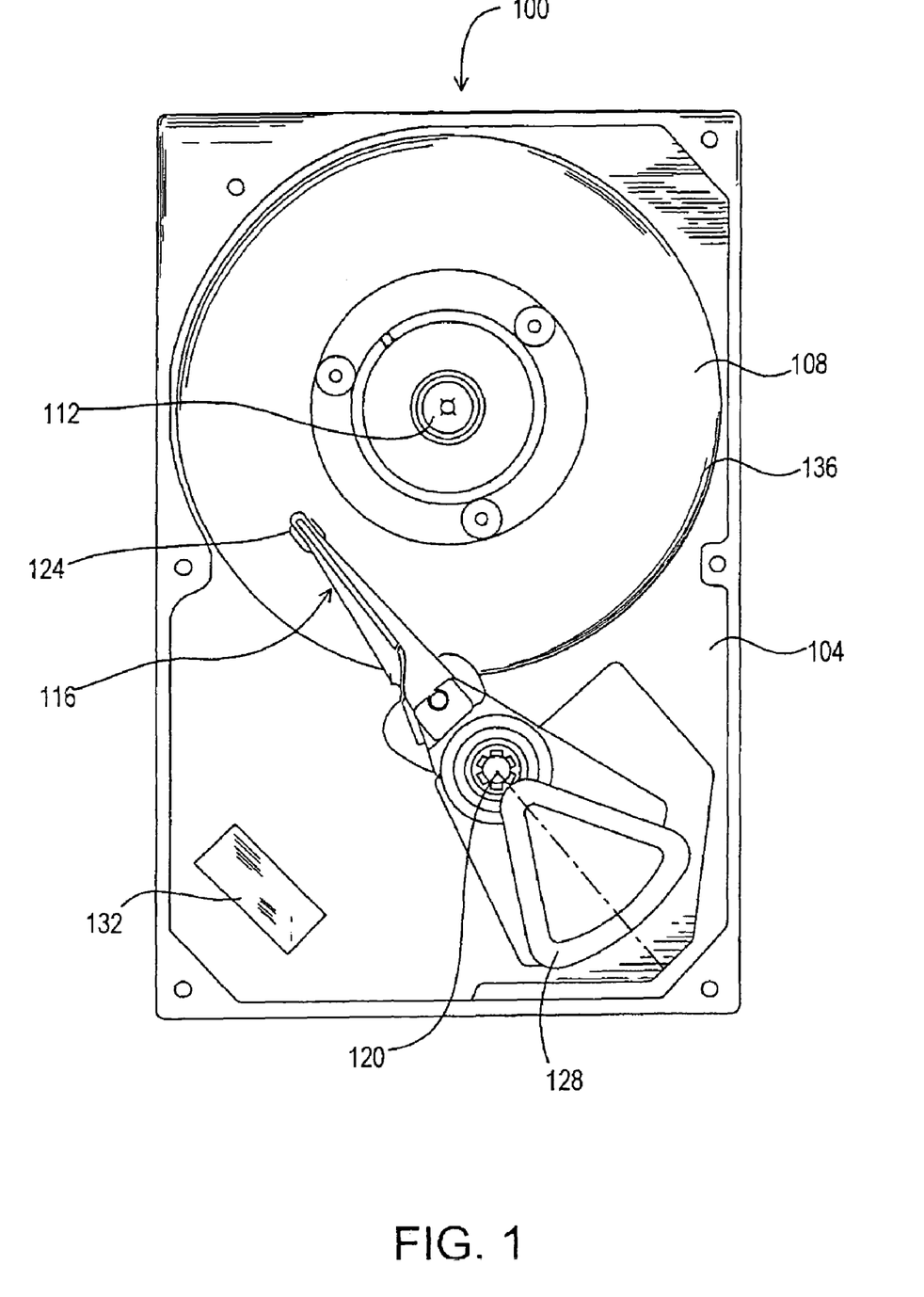
FIG. 1 is a top view of a conventional disk drive with the cover removed.

FIG. 1 illustrates a disk drive 100 that includes a base 104 and a magnetic disk (or disks) 108 (only one of which is shown). The disk 108 is interconnected to the base 104 by a spindle motor (not shown) mounted within or beneath the hub 112 such that the disk 108 can be rotated relative to the base 104. An actuator arm assembly 116 is interconnected to the base 104 by a bearing 120 and suspends a transducer head 124 at a first end. The transducer head 124 reads data from and writes data to the disk 108. A voice coil motor 128 pivots the actuator arm assembly 116 about the bearing 120 to radially position the transducer head 124 with respect to the disk 108. The voice coil motor 128 is operated by a controller 132 that is operatively connected to a host computer (not shown). By changing the radial position of the transducer head 124 with respect to the disk 108, the transducer head 124 can access different tracks 136 on the disk 108.

Figure 2:
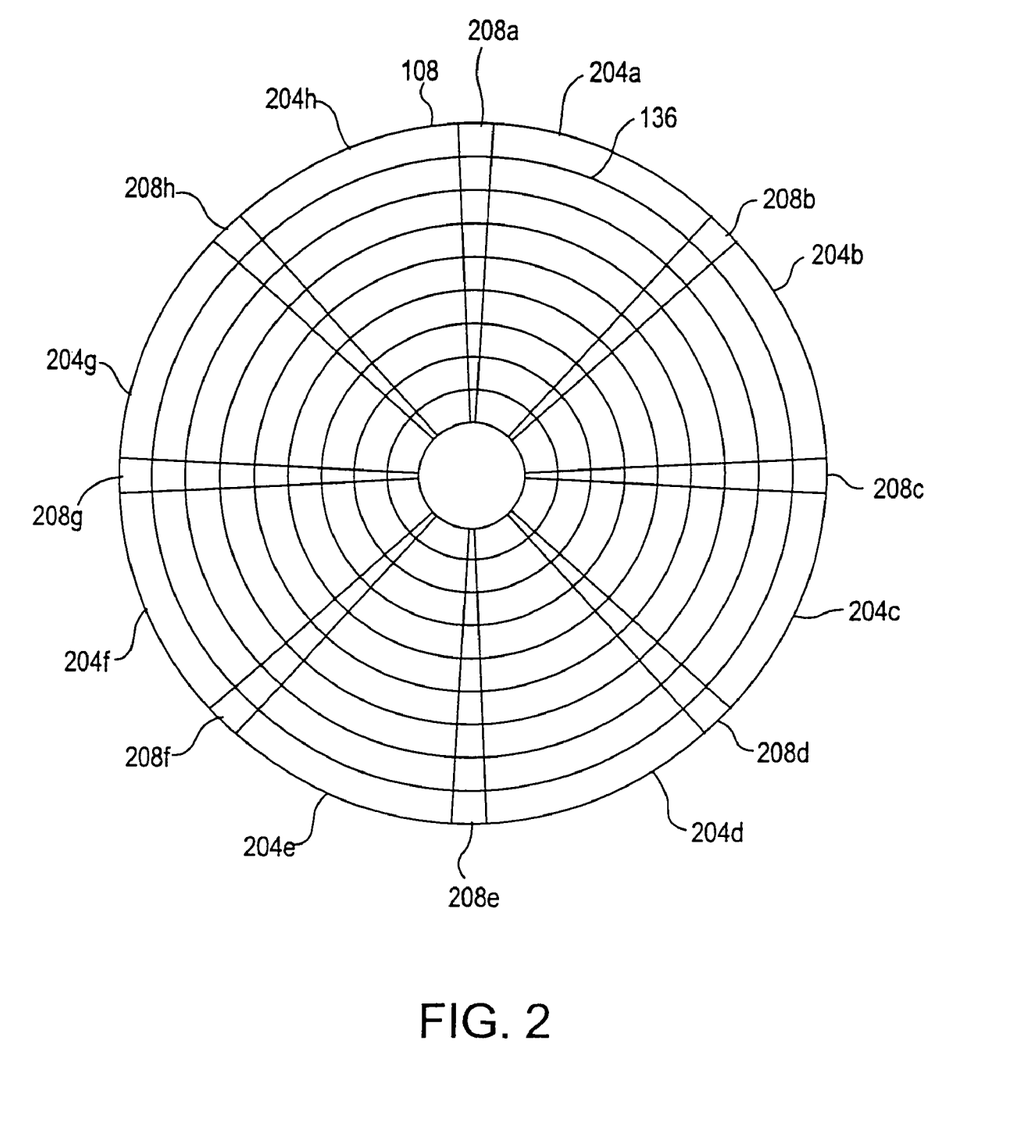
FIG. 2 is a schematic representation of a disk.

FIG. 2 illustrates the disk 108 in more detail. The tracks 136 are divided into data fields 204a–204h and servo sectors 208a–208h. The data fields 204a–204h store user data and the servo sectors 208a–208h store servo information to provide the transducer head 124 with the position of the transducer head 124 relative to the centerline of a target track 136.

Although the disk 108 is illustrated having a relatively small number of tracks 136 and servo sectors 208, a typical disk contains a very large number of tracks and servo sectors. For example, disks having over 14,000 tracks per inch and 240 servo sectors per track are presently available. In addition, alternate configurations of the disk 108 are possible. For example, one surface of the disk 108 can be dedicated to servo information while the other surface of the disk 108 (and any remaining disks 108 in the disk drive 100) can exclusively store user data.

Figure 3:
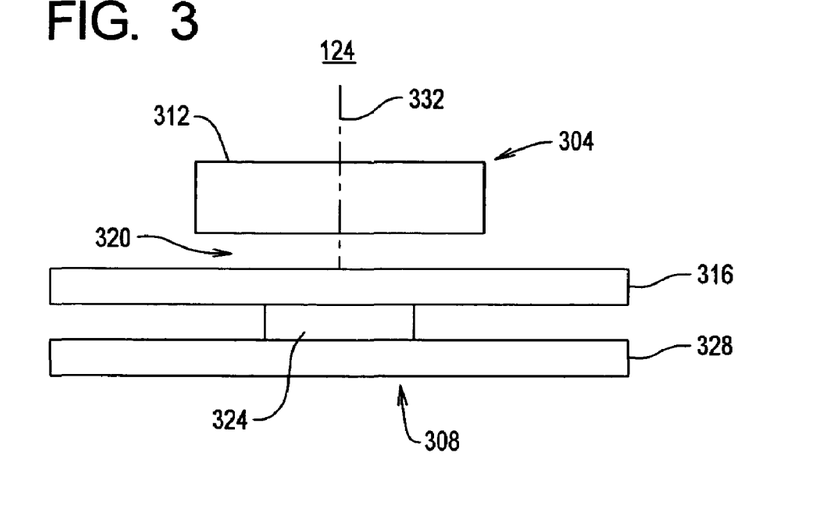
FIG. 3 is a plan view of a transducer head in which the illustrated surface faces the disk.

FIG. 3 illustrates the transducer head 124 in more detail. The transducer head 124 includes a write head 304 and a magnetoresistive read head 308.

The write head 304 includes a write pole 312 and a shared shield 316. The write pole 312 and the shared shield 316 are joined magnetically to form a yoke about which a coil of wire is wrapped (not shown). During a write operation, current is passed through the coil to produce a magnetic field within the yoke. At a write gap 320 between the write pole 312 and the shared shield 316, the magnetic field spreads out because the magnetic permeability of the write gap 320 is less than that of the yoke. The write gap 320 is positioned in close proximity to the disk 108, allowing the magnetic field to magnetize the disk 108 so that digital information in the form of magnetic flux transitions is encoded on the disk 108. A "1" is encoded on the disk 108 by reversing the direction of the current in the coil, thereby reversing the direction in which the disk 108 is magnetized. A "0" is encoded on the disk 108 by the absence of a change in magnetic polarity. Of course, these conventions can be reversed.

The read head 308 includes the shared shield 316, a magnetoresistive strip 324 and a read shield 328. The magnetoresistive strip 324 is connected to a current source (not shown). Because the electrical resistance of the magnetoresistive strip 324 varies with the strength and direction of an applied magnetic field, the magnetic flux transitions from the disk 108 are sensed by a change in voltage drop across the magnetoresistive strip 324. Furthermore, the magnetic shields 316 and 328 limit the effect of magnetic flux transitions in adjacent tracks 136 on the magnetoresistive strip 324. The transducer head 124 can contain other types of read heads such as an inductive, giant magnetoresistive, spin valve or dual spin valve read head.

Figure 4:
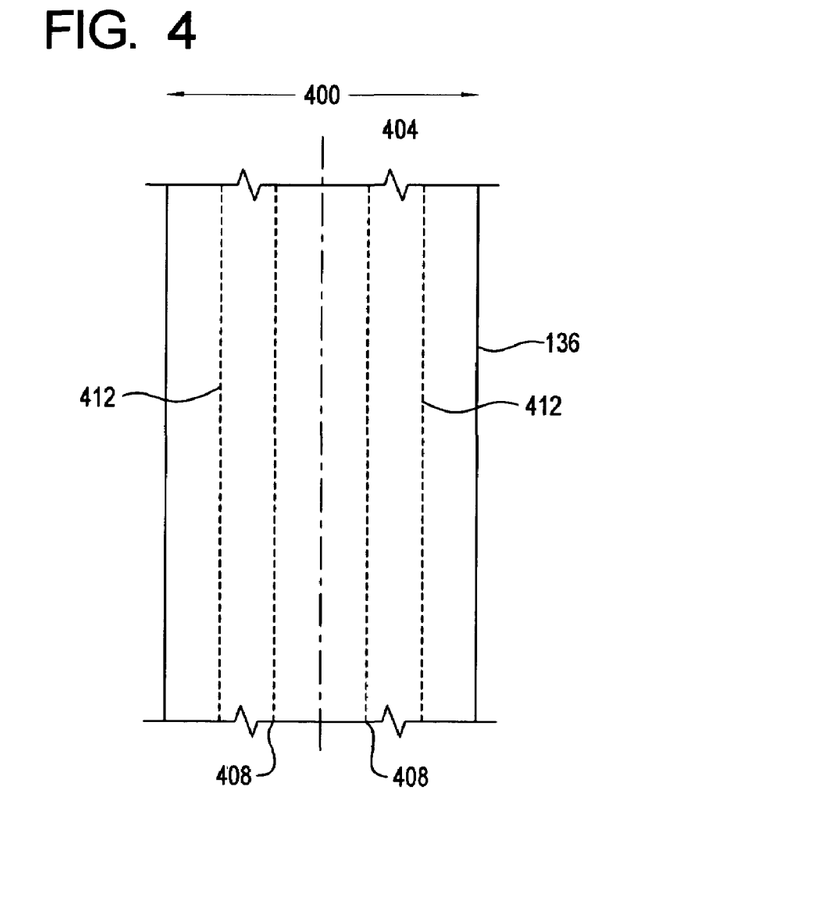
FIG. 4 is a partial schematic illustration of a track.

FIG. 4 shows the track 136 in more detail. The track 136 has a track width 400 of about 1 micrometer and a track centerline 404 perpendicular thereto. The write pole 312 is about ⅔ the track width 400. By centering the data on the track 136 about the track centerline 404, the maximum distance between the data on the adjacent tracks 136 is maintained and overwriting or corrupting the data on the adjacent tracks 136 is reduced. The disk drive 100 expects the data on the track 136 to be positioned about the track centerline 404 during read operations. When the transducer head 124 does not precisely follow the track centerline 404, the position error may be expressed in terms of the track width 400. For instance, a normal shock threshold 408 is 15 percent of the track width 400 (as measured from either side of the track centerline 404) and a severe shock threshold 412 is 35 percent of the track width 400 (as measured from either side of the track centerline 404).

Figure 5:
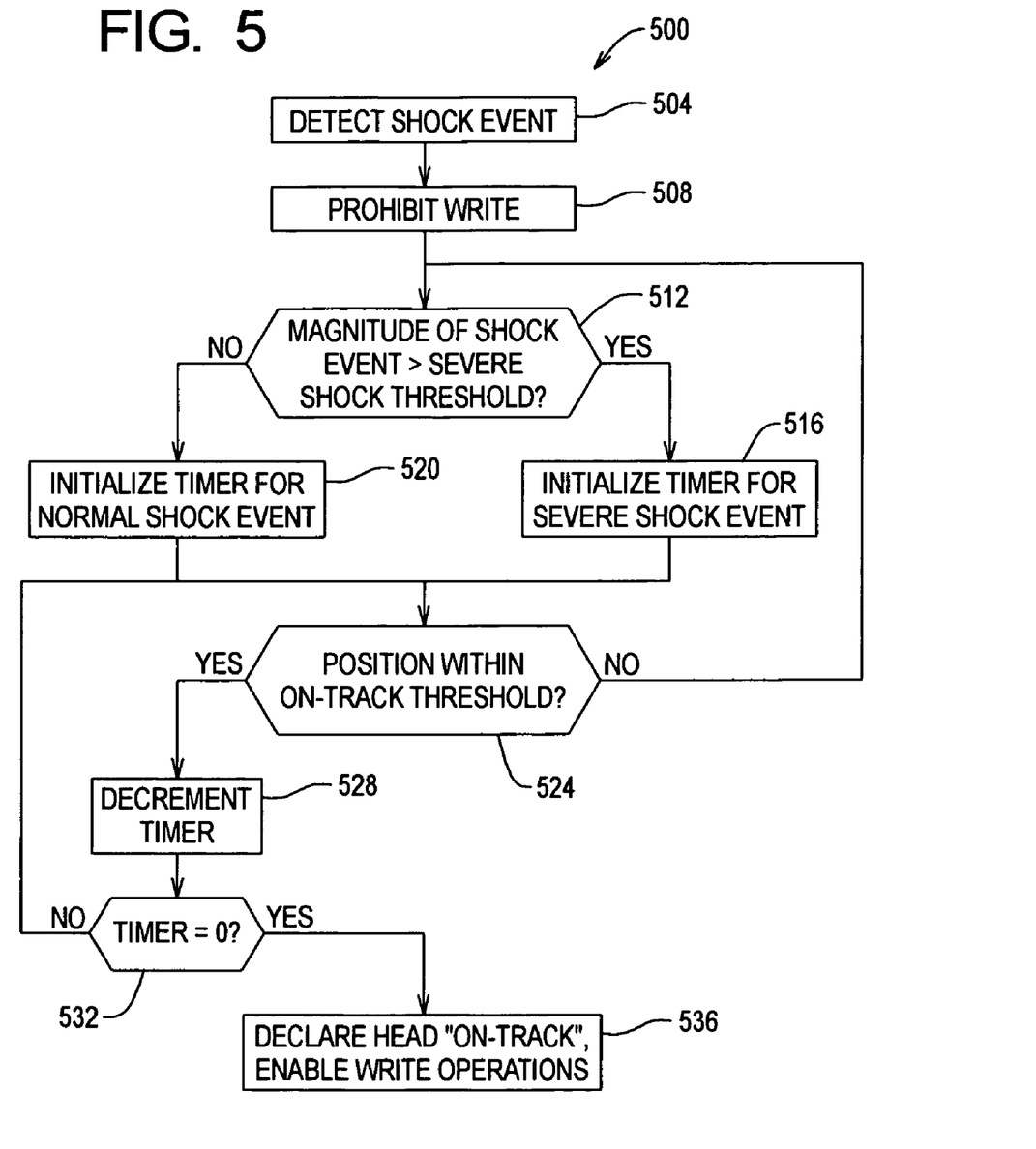
FIG. 5 is a functional flow chart of dynamic shock detection using a severe shock timer according to an embodiment of the present invention.

FIG. 5 is a flow chart 500 of dynamic shock detection using a severe shock timer according to an embodiment of the present invention. Initially, a shock event is detected by a deviation between the write head centerline 332 and the track centerline 404 of 15 percent of the track width 400 as the write head centerline 332 reaches the normal shock threshold 408 (step 504). Immediately thereafter, the write operations are prohibited (step 508).

The magnitude of the shock event is considered (step 512). If the shock event is a severe shock, which is detected by a deviation between the write head centerline 332 and the track centerline 404 of 35 percent of the track width 400 as the write head centerline 332 reaches the severe shock threshold 412, then an off-track timer is initialized with a severe shock time value (step 516). Otherwise, the shock event is normal (mild) and the off-track timer is initialized with a normal shock time value that is shorter than the severe shock time value (step 520). While the off-track timer is running, write operations by the transducer head 124 are disabled. Thus, the severe shock time value prohibits the write operations for a longer time period than the normal shock time value, thereby allowing oscillations in the hub 112 caused by a severe shock event (but not a normal shock event) to dampen. Accordingly, the write operations are inhibited only as long as necessary, thereby increasing the data transfer rate.

After the off-track timer is initialized, the disk drive 100 determines whether the transducer head 124 is within an on-track threshold, which is detected by a deviation between the write head centerline 332 and the track centerline 404 of less than 15 percent of the track width 400 as the write head centerline 332 fails to reach the normal shock threshold 408 (step 524). If the transducer head 124 is not within the on-track threshold, then the process returns to step 512 to determine the magnitude of the shock event and proceeds to step 516 or 520 as appropriate.

The time value held by the off-track timer can only be increased at steps 516 and 520. For example, if the time value held by the off-track timer is 5 milliseconds when step 520 is entered, and the normal shock time value is 130 microseconds, then the off-track timer is not reset to 130 microseconds. Instead, the time value remains at 5 milliseconds. However, if the initial time value at step 516 or 520 is greater than the time value held by the off-track timer when step 516 or 520 is entered, then the off-track timer is reset to the initial time value. For example, if the time value held by the off-track timer is 50 microseconds when step 520 is entered, and the normal shock time value is 130 microseconds, then the off-track timer is reset to 130 microseconds.

If the transducer head 124 is within the on-track threshold (step 524), then the off-track timer is decremented as each servo sector 208 in the track 136 passes beneath the transducer head 124 (step 528). The disk drive 100 determines whether the time value held by the off-track timer is zero (step 532). If not, the write operations continue to be prohibited and the process returns to step 524 to determine whether the transducer head 124 is within the on-track threshold. Otherwise, the transducer head 124 is declared "on-track" and the write operations are enabled (step 536).

The off-track timer disables the write operations by decrementing the time value as the servo sectors 208 pass beneath the transducer head 124. For example, the severe shock time value sets the off-track timer to expire after 120 servo sectors 208 pass beneath the transducer head 124, and the normal shock time value sets the off-track timer to expire after two servo sectors 208 pass beneath the transducer head 124.

The off-track timer in another approach disables the write operations for an initialized time period. As examples, the severe shock time value disables the write operations until the disk 108 has made at least ¼ of a revolution but less than a full revolution, or until the disk 108 has made at least ½ of a revolution but not more than ¾ of a revolution, or for the time necessary for the disk 108 to make about ¾ of a revolution, or for approximately six milliseconds.

The time period, the number of servo sectors 208 that pass beneath the transducer head 124 and the amount the disk 108 rotates during which the write operations are prohibited in response to a severe shock event may be greater than that determined by the severe shock time value if the transducer head 124 does not return to the on-track state by the next position sample. Likewise, the time period, number of servo sectors 208 that pass beneath the transducer head 124 and the amount the disk 108 rotates during which the write operations are prohibited in response to a non-severe shock event may be greater than that determined by the normal shock time value if the transducer head 124 does not return to the on-track state by the next position sample.

Although a single off-track timer initialized to the severe shock time value or the normal shock time value has been described, the off-track timer can be initialized to additional time values of varying lengths in response to shocks of varying magnitudes. In addition, multiple off-track timers can be initialized to separate time values. For example, a severe shock timer can be initialized to the severe shock time value in step 516 and a normal shock timer can be initialized to the normal shock time value in step 520.

Figure 6A:
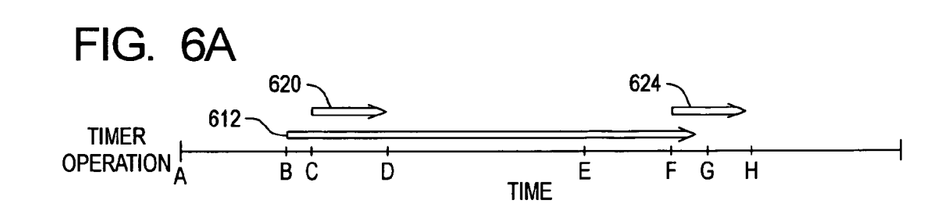
FIG. 6A is a time line illustration of write faults for the operation in FIG. 5.
Figure 6B:
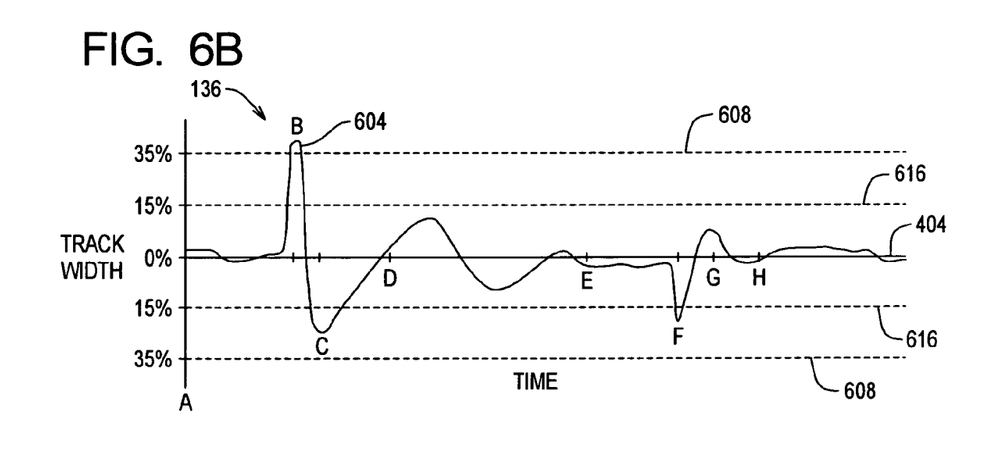
FIG. 6B is a time line illustration of transducer head position relative to a track centerline for the operation in FIG. 5.

FIGS. 6A and 6B are time line illustrations of write faults and the transducer head 124 position relative to the track 136, respectively, for the flow chart 500. The transducer head position 604 indicates the position of the write head centerline 332 with respect to the track centerline 404 in terms of the track width 400. The normal shock threshold 616 is 15 percent of the track width 400 (as measured from either side of the track centerline 404) and the severe shock threshold 608 is 35 percent of the track width 400 (as measured from either side of the track centerline 404). Furthermore, a severe shock timer is initialized to the severe shock time value and a normal shock timer is initialized to the normal shock time value.

The transducer head position 604 is near the track centerline 404 and the timers and the write fault are inactive and the write operations are allowed at time A. The transducer head position 604 has a large deviation from the track centerline 404 and crosses the severe shock threshold 608 at time B, thereby indicating a severe shock event at time B and activating the severe shock timer from time B to time G as shown by the severe shock timer operation 612. The transducer head position 604 has a series of relatively large amplitude, low frequency oscillations that follow the severe shock event at time B and continue to time E. Because the severe shock timer is active and therefore the write fault is active and no write operations occur from time B to time G, track misregistration errors due to the relatively long ringing between times B and E are avoided.

The transducer head position 604 oscillations extend beyond the normal shock threshold 616 but not the severe shock threshold 608 at time C and subside within the normal shock threshold 616 at times D and E, thereby activating the normal shock timer from time C to time D as shown by the normal shock timer operation 620 without resetting the severe shock timer. However, the write fault is not affected by the normal shock timer operation 620 since it occurs during the severe shock timer operation 612. Of course, the normal shock timer need not be activated while the severe shock timer is in operation.

The transducer head position 604 has another deviation from the track centerline 404 and crosses the normal shock threshold 616 but not the severe shock threshold 608 at time F, thereby indicating a normal shock event at time F and activating the normal shock timer from time F to time H as shown by the normal shock timer operation 620 without reactivating the severe shock timer. Although the write fault is not affected by the normal shock timer operation 620 from time F to time G since it occurs during the severe shock timer operation 612, the write fault is activated by the normal shock timer operation 620 from time G to time H.

The transducer head position 604 oscillations subside within the normal shock threshold 616 at times G and H, and therefore the timers and the write fault are inactive at time H at which time the write operations are allowed again provided the transducer head 124 is otherwise adequately centered relative to the track 136.

Figure 7:
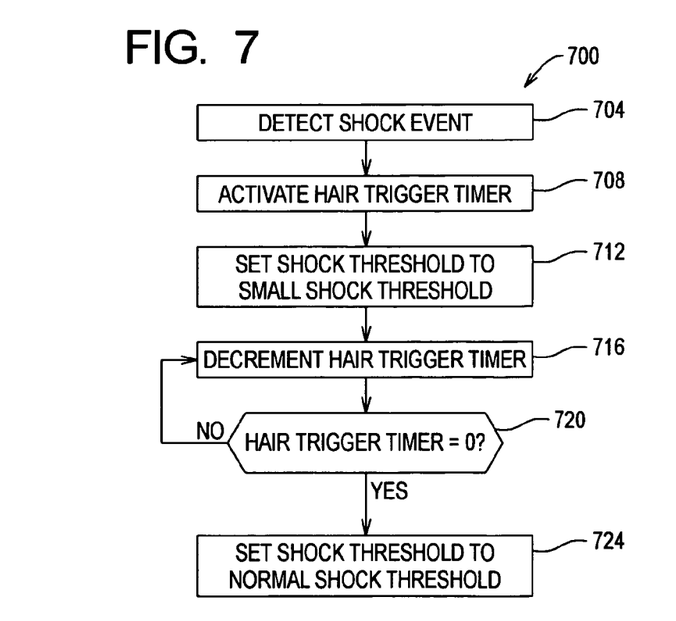
FIG. 7 is a functional flow chart of dynamic shock detection using a hair trigger timer according to another embodiment of the present invention.

FIG. 7 is a flow chart 700 of dynamic shock detection using a hair trigger timer according to another embodiment of the present invention. Initially, a shock event is detected (step 704). The shock event can be detected in a variety of ways. For example, the shock event is detected by a predetermined deviation between the write head centerline 332 and the track centerline 404. As another example, the shock event is detected by a minimum velocity at which the transducer head 124 exceeds a predetermined distance (such as 10 percent of the track width 400) from the track centerline 404.

After the shock event is detected, a hair trigger timer is activated (step 708) and the shock threshold is lowered from its normal value to a small value (step 712). For example, the normal shock threshold is 20 percent of the track width 400 and the small shock threshold is 10 percent of the track width 400. As another example, the normal shock threshold is a normal velocity of the transducer head 124 and the small shock threshold is a small velocity of the transducer head 124 which is lower than the normal velocity. In any case, the hair trigger timer is activated in response to the shock event, and when the hair trigger timer is running, the small shock threshold replaces the normal shock threshold and therefore the disk drive 100 is more sensitive to shock events and activates the write fault in response to small shock events that are within the normal shock threshold.

The hair trigger timer is decremented as each servo sector 208 in the track 136 passes beneath the transducer head 124 (step 716). When the hair trigger timer is zero or has otherwise run its course (step 720) then the small shock threshold is replaced by the normal shock threshold (step 724).

Thus, the hair trigger timer increases shock sensitivity to prohibit the write operations more easily for a limited time period after a shock event is detected to better protect against small shock events in close temporal proximity to the initial shock event that might otherwise go undetected and lead to track misregistration errors. In addition, the increased protection against track misregistration errors has little affect on the data transfer rate of the disk drive 100.

Although the write fault is activated in response to the hair trigger timer, and therefore remains active while the hair trigger timer is running, other approaches are available. For example, the write fault can be activated by a separate shock timer.

Figure 8A:
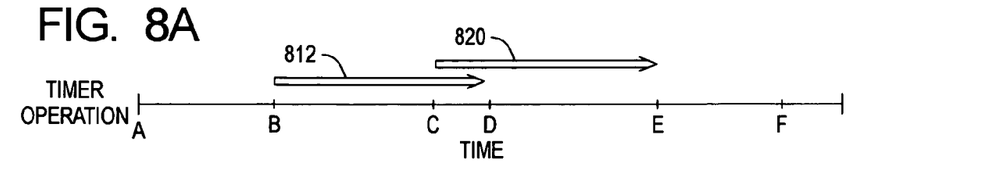
FIG. 8A is a time line illustration of write faults for the operation in FIG. 7.
Figure 8B:
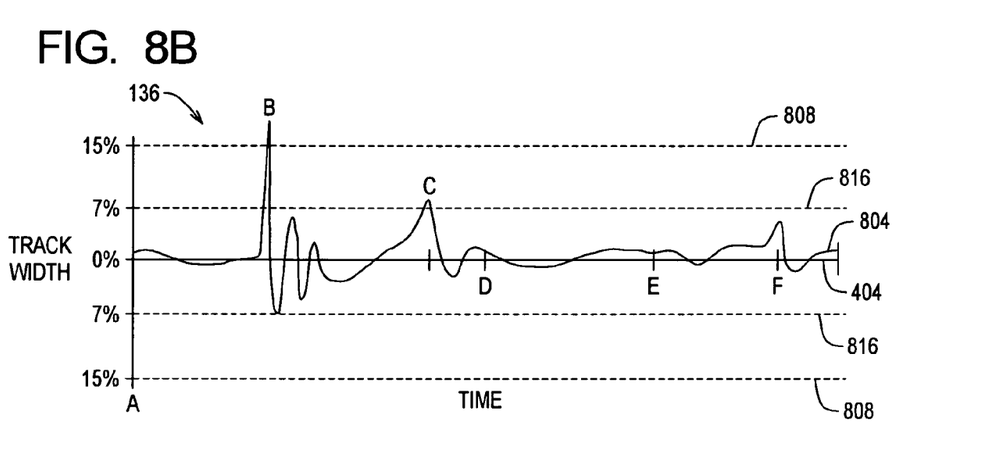
FIG. 8B is a time line illustration of transducer head position relative to a track centerline for the operation in FIG. 7.

FIGS. 8A and 8B are time line illustrations of writes faults and the transducer head 124 position relative to the track 136, respectively, for the flow chart 700. The transducer head position 804 indicates the position of the write head centerline 332 with respect to the track centerline 404 in terms of the track width 400. The normal shock threshold 808 is 15 percent of the track width 400 (as measured from either side of the track centerline 404) and the small shock threshold 816 is 7 percent of the track width 400 (as measured from either side of the track centerline 404).

The transducer head position 804 is near the track centerline 404 and the hair trigger timer and the write fault are inactive and the write operations are allowed at time A. The transducer head position 804 has a large deviation from the track centerline 404 and crosses the normal shock threshold 808 at time B, thereby indicating a shock event at time B and activating the hair trigger timer from time B to time D as shown by the hair trigger timer operation 812. The transducer head position 804 has a series of relatively small amplitude, high frequency oscillations that follow the shock event at time B and subside before time C. Because the hair trigger timer is active and therefore the write fault is active and no write operations occur from time B to time D, track misregistration errors due to the relatively short ringing between times B and C are avoided.

The transducer head position 804 has another deviation from the track centerline 404 and crosses the small shock threshold 816 but not the normal shock threshold 808 at time C, thereby indicating a small shock event at time C and resetting the hair trigger timer so that the hair trigger timer is active from time C to time E as shown by the hair trigger timer operation 820. Although the write fault is not affected by the hair trigger timer operation 820 from time C to time D since it occurs during the hair trigger timer operation 812, the write fault is activated by the hair trigger timer operation 820 from time D to time E.

The transducer head position 804 oscillations subside within the small shock threshold 816 at times D to F, and therefore the hair trigger timer and the write fault are inactive at times E and F at which times the write operations are allowed again provided the transducer head 124 is otherwise adequately centered relative to the track 136.

Figure 9:
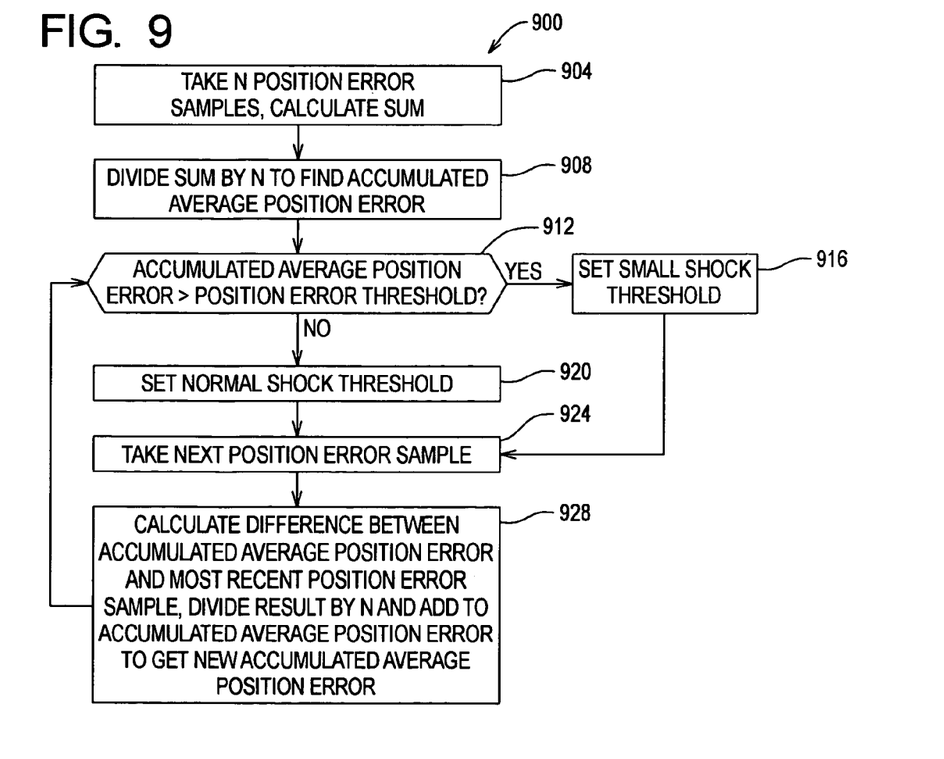
FIG. 9 is a functional flow chart of dynamic shock detection using an accumulated average position error according to yet another embodiment of the present invention.

FIG. 9 is a flow chart 900 of dynamic shock detection using an accumulated average position error according to yet another embodiment of the present invention. Initially, N position error samples of the write head centerline 332 relative to the track centerline 404 are taken as N servo sectors 208 in the track 136 pass beneath the transducer head 124, with one sample taken per servo sector 208, and the position error samples are added together (step 904). The sum of the position error samples is divided by N to obtain an accumulated average position error (step 908). The accumulated average position error is compared to a position error threshold (step 912). If the accumulated average position error is greater than the position error threshold then a small shock threshold (which is lower than the normal shock threshold) is set (step 916), otherwise the normal shock threshold is set (step 920).

The next position error sample is then taken (step 924). The difference between the accumulated average position error in step 912 and the most recent position error sample in step 924 is calculated, and the result is divided by N and then added to the accumulated average position error to obtain a new (updated) accumulated average position error (step 928). The process then returns to step 912 to compare the accumulated average position error in step 928 with the position error threshold, set the shock threshold to the normal value or the small value as appropriate in steps 916 and 920 and then update the accumulated average position error using another position error sample in steps 924 and 928.

Thus, the shock sensitivity is increased to prohibit the write operations more easily while the accumulated average position error is large to better protect against small shock events that might otherwise go undetected and lead to track misregistration errors since the transducer head 124 is persistently positioned on one side of the track centerline 404 and therefore more vulnerable to shock events.

Although the accumulated average position error is updated as each servo sector 208 passes beneath the transducer head 124, other approaches are available. For example, the accumulated average position error can be computed periodically as every fourth servo sector 208 passes beneath the transducer head 124. In addition, the accumulated average position error can be determined from a continuously collected position error. Furthermore, the accumulated position error need not be an average value. For example, an accumulated gross position error can be compared to an appropriate position error threshold.

Figure 10A:
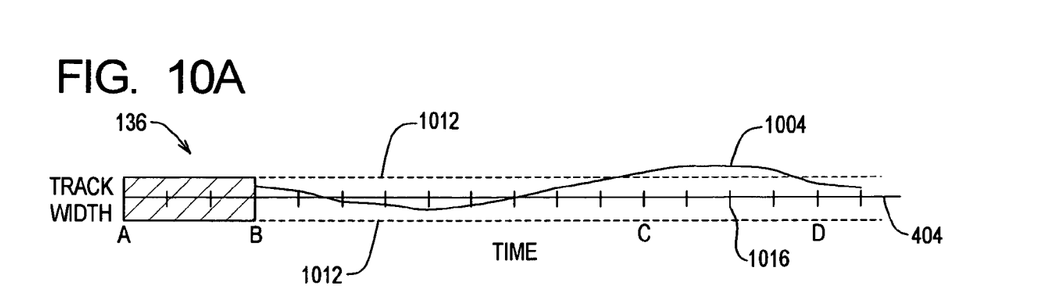
FIG. 10A is a time line illustration of the accumulated average position error for the operation in FIG. 9.
Figure 10B:
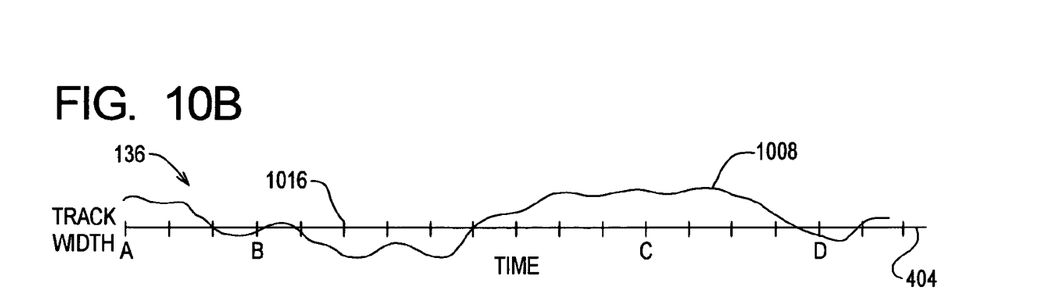
FIG. 10B is a time line illustration of transducer head position relative to a track centerline for the operation in FIG. 9.

FIGS. 10A and 10B are time line illustrations of the accumulated average position error and the transducer head 124 position relative to the track 136, respectively, for the flow chart 900. The accumulated average position error 1004 is shown in terms of the track width 400, and the transducer head position 1008 indicates the position of the write head centerline 332 with respect to the track centerline 404 in terms of the track width 400. The position error threshold 1012 is a predetermined amount of the track width 400 (as measured from either side of the track centerline 404). Furthermore, the position error samples are taken periodically at the sample times 1016.

The accumulated average position error 1004 is unknown at time A because the requisite number of position error samples have not yet been collected, and therefore the write fault is inactive and the write operations are allowed. The accumulated average position error 1004 is known and within the position error threshold 1012 and therefore the write fault remains inactive and the write operations remain allowed at time B.

The accumulated average position error 1004 crosses the position error threshold 1012 shortly before time C and is detected by the position error sample at time C, thereby indicating that the transducer head 124 has been positioned on one side of the track centerline 404 for too long, and therefore the shock threshold is lowered from its normal value to a small value. While the small shock threshold replaces the normal shock threshold, the disk drive 100 is more sensitive to shock events and activates the write fault in response to small shock events that are within the normal shock threshold.

The accumulated average position error 1004 subsides within the position error threshold 1012 shortly before time D and is detected by the position error sample at time D, and therefore the shock threshold is returned to its normal value.

The timers described above can be implemented with a count value that is decremented by each sector 208 on the track 136 that passes beneath the transducer head 124, or alternatively, as a clock timer based on a time count. Furthermore, the timers can be implemented as software routines in the controller 132 or as hardware devices in communication with the controller 132.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments herein are further intended to explain the best mode presently known of practicing the invention and to enable others skilled in the art to utilize the invention in such or in other embodiments and with various modifications required by their particular application or use of the invention. It is intended that the appended claims include alternative embodiments to the extent permitted by the prior art.

What is claimed is:

1. A method for reducing the off-track position error of a transducer head in a disk drive, comprising:
   setting a first write fault threshold as an active write fault threshold;
   measuring a distance of the transducer head from a track centerline of a track multiple times to obtain position error samples;
   calculating an accumulated position error based on the position error samples;
   comparing the accumulated position error to a position error threshold; and
   setting a second write fault threshold as the active write fault threshold if the accumulated position error is greater than the position error threshold, wherein the first write fault threshold corresponds to a larger off-track event than the second write fault threshold.

2. The method of claim 1, wherein the accumulated position error is an accumulated average position error based on an average of the position error samples.

3. The method of claim 1, wherein the accumulated position error is an accumulated gross position error based on a total of the position error samples.

4. The method of claim 1, wherein the position error samples are taken at periodic intervals.

5. The method of claim 1, wherein the position error samples are taken as servo sectors pass beneath the transducer head.

6. The method of claim 1, including:
determining N position error samples based on N servo sectors that pass beneath the transducer head;
calculating a sum of the N position error samples;
dividing the sum by N to obtain an accumulated average position error;
comparing the accumulated average position error to an average position error threshold;
setting the first write fault threshold as the active write fault threshold if the accumulated average position error is less than the average position error threshold; and
setting the second write fault threshold as the active write fault threshold if the accumulated average position error is greater than the average position error threshold.

7. The method of claim 6, including:
determining a next position error sample based on another servo sector that passes beneath the transducer head;
calculating a difference between the accumulated average position error and the next position error sample;
dividing the difference by N to obtain a quotient;
adding the quotient to the accumulated average position error to obtain an updated accumulated average position error;
comparing the updated accumulated average position error to the average position error threshold;
setting the first write fault threshold as the active write fault threshold if the updated accumulated average position error is less than the average position error threshold; and
setting the second write fault threshold as the active write fault threshold if the undated accumulated average position error is greater than the average position error threshold.

8. A drive, comprising:
a base;
a spindle motor;
a disk including tracks arranged concentrically about the spindle motor, wherein each of the tracks is segmented into servo sectors and the disk is rotated by the spindle motor;
a transducer head having a read head for reading information from the tracks and a write head for writing information to the tracks;
a voice coil motor, interconnected to the transducer head, for moving the transducer head in a radial direction with respect to the tracks; and
a controller, interconnected to the voice coil motor, for controlling a position of the transducer head with respect to the tracks, wherein the controller accumulates position error samples of the transducer head with respect to a track centerline of a track being followed by the transducer head, lowers a write fault threshold from a normal value to a small value if the accumulated position error is greater than a position error threshold, and raises the write fault threshold from the small value to the normal value if the accumulated position error is less than the position error threshold.

9. The disk drive of claim 8, wherein the accumulated position error is an accumulated average position error based on an average of the position error samples.

10. The disk drive of claim 8, wherein the position error samples are taken as servo sectors pass beneath the transducer head.

11. The disk drive of claim 8, wherein the controller lowers the write fault threshold from the normal value to the small value in response to the accumulated position error based on N position error samples taken from N servo sectors.

12. The disk drive of claim 11, wherein the controller raises the write fault threshold from the small value to the normal value in response to the accumulated position error based on the N position error samples and a next position error sample taken from a next servo sector.

13. The disk drive of claim 11, wherein the N servo sectors are consecutive servo sectors.

14. The disk drive of claim 11, wherein the N servo sectors are not consecutive servo sectors.

15. The method of claim 1, wherein the accumulated position error indicates whether the transducer head is positioned more on one side of the track centerline than the other side of the track centerline.

16. The method of claim 1, wherein the accumulated position error increases as the transducer head is positioned on one side of the track centerline and decreases as the transducer head is positioned on both sides of the track centerline.

17. The method of claim 1, wherein the accumulated position error is greater than the position error threshold if the transducer head is persistently positioned on one side of the track centerline and is less than the position error threshold if the transducer head is persistently positioned on both sides of the track centerline.

18. The disk drive of claim 8, wherein the accumulated position error indicates whether the transducer head is positioned more on one side of the track centerline than the other side of the track centerline.

19. The disk drive of claim 8, wherein the accumulated position error increases as the transducer head is positioned on one side of the track centerline and decreases as the transducer head is positioned on both sides of the track centerline.

20. The disk drive of claim 8, wherein the accumulated position error is greater than the position error threshold if the transducer head is persistently positioned on one side of the track centerline and is less than the position error threshold if the transducer head is persistently positioned on both sides of the track centerline.

21. In a disk drive that includes a transducer head and a disk, wherein the transducer head reads from and writes to the disk, and the transducer head is prohibited from writing to the disk by a write fault, a method of dynamically detecting shock events, comprising:
replacing a normal shock threshold with a small shock threshold in response to an accumulated position error of the transducer head relative to a track centerline of a track on the disk that is greater than a position error threshold, thereby increasing the shock sensitivity of the write fault; and
replacing the small shock threshold with the normal shock threshold in response to the accumulated position error that is less than the position error threshold, thereby decreasing the shock sensitivity of the write fault.

22. The method of claim 21, wherein the normal shock threshold is a first predetermined distance of a write head centerline of a write head in the transducer head from the track centerline, the small shock threshold is a second predetermined distance of the write head centerline from the track centerline, and the first predetermined distance is greater than the second predetermined distance.

23. The method of claim 22, wherein the first predetermined distance is about twice the second predetermined distance.

24. The method of claim 21, wherein the accumulated position error is an accumulated average position error.

25. The method of claim 21, wherein the accumulated position error is an accumulated gross position error.

26. The method of claim 21, wherein the accumulated position error is based on position error samples taken as servo sectors on the track pass beneath the transducer head.

27. The method of claim 21, wherein the accumulated position error is based on continuously collected position error.

28. The method of claim 21, wherein the accumulated position error indicates whether the transducer head is positioned more on one side of the track centerline than the other side of the track centerline.

29. The method of claim 21, wherein the accumulated position error increases as the transducer head is positioned on one side of the track centerline and decreases as the transducer head is positioned on both sides of the track centerline.

30. The method of claim 21, wherein the accumulated position error is greater than the position error threshold if the transducer head is persistently positioned on one side of the track centerline and is less than the position error threshold if the transducer head is persistently positioned on both sides of the track centerline.

31. In a disk drive that includes a transducer head and a disk, wherein the transducer head reads from and writes to the disk, and the transducer head is prohibited from writing to the disk by a write fault, a method of dynamically detecting shock events, comprising:
    calculating an accumulated position error based on position error samples of the transducer head relative to a track centerline of a track on the disk;
    replacing a normal shock threshold with a small shock threshold in response to the accumulated position error that is greater than a position error threshold, thereby increasing the shock sensitivity of the write fault;
    updating the accumulated position error based on additional position error samples of the transducer head relative to the track centerline; and
    replacing the small shock threshold with the normal shock threshold in response to the updated accumulated position error that is less than the position error threshold, thereby decreasing the shock sensitivity of the write fault.

32. The method of claim 31, wherein the normal shock threshold is a first predetermined distance of a write head centerline of a write head in the transducer head from the track centerline, the small shock threshold is a second predetermined distance of the write head centerline from the track centerline, and the first predetermined distance is greater than the second predetermined distance.

33. The method of claim 32, wherein the first predetermined distance is about twice the second predetermined distance.

34. The method of claim 31, wherein the accumulated position error is an accumulated average position error.

35. The method of claim 31, wherein the accumulated position error is an accumulated gross position error.

36. The method of claim 31, wherein the position error samples are taken as servo sectors on the track pass beneath the transducer head.

37. The method of claim 31, wherein the position error samples are continuously collected.

38. The method of claim 31, wherein the accumulated position error indicates whether the transducer head is positioned more on one side of the track centerline than the other side of the track centerline.

39. The method of claim 31, wherein the accumulated position error increases as the transducer head is positioned on one side of the track centerline and decreases as the transducer head is positioned on both sides of the track centerline.

40. The method of claim 31, wherein the accumulated position error is greater than the position error threshold if the transducer head is persistently positioned on one side of the track centerline and is less than the position error threshold if the transducer head is persistently positioned on both sides of the track centerline.

41. In a disk drive that includes a transducer head and a disk, wherein the transducer head reads from and writes to the disk, and the transducer head is prohibited from writing to the disk by a write fault, a method of dynamically detecting shock events, comprising:
    activating the write fault in response to a first shock event that is greater than a normal shock threshold while an active shock threshold is a normal shock threshold;
    calculating an accumulated position error based on position error samples of the transducer head relative to a track centerline of a track on the disk;
    lowering the active shock threshold from the normal shock threshold to a small shock threshold after the first shock event in response to the accumulated position error that is greater than a position error threshold, thereby increasing the shock sensitivity of the write fault;
    activating the write fault in response to a second shock event that is greater than the small shock threshold and less than the normal shock threshold while the active shock threshold is the small shock threshold;
    updating the accumulated position error based on additional position error samples of the transducer head relative to the track centerline while the active shock threshold is the small shock threshold;
    raising the active shock threshold from the small shock threshold to the normal shock threshold after the second shock event in response to the updated accumulated position error that is less than the position error threshold, thereby decreasing the shock sensitivity of the write fault; and
    excluding activating the write fault in response to a third shock event that is greater than the small shock threshold and less than the normal shock threshold while the active shock threshold is the normal shock threshold.

42. The method of claim 41, wherein the normal shock threshold is a first predetermined distance of a write head centerline of a write head in the transducer head from the track centerline, the small shock threshold is a second predetermined distance of the write head centerline from the track centerline, and the first predetermined distance is greater than the second predetermined distance.

43. The method of claim 42, wherein the first predetermined distance is about twice the second predetermined distance.

44. The method of claim 41, wherein the accumulated position error is an accumulated average position error.

45. The method of claim 41, wherein the accumulated position error is an accumulated gross position error.

46. The method of claim 41, wherein the position error samples are taken as servo sectors on the track pass beneath the transducer head.

47. The method of claim 41, wherein the position error samples are continuously collected.

48. The method of claim 41, wherein the accumulated position error indicates whether the transducer head is positioned more on one side of the track centerline than the other side of the track centerline.

49. The method of claim 41, wherein the accumulated position error increases as the transducer head is positioned on one side of the track centerline and decreases as the transducer head is positioned on both sides of the track centerline.

50. The method of claim 41, wherein the accumulated position error is greater than the position error threshold if the transducer head is persistently positioned on one side of the track centerline and is less than the position error threshold if the transducer head is persistently positioned on both sides of the track centerline.

* * * * *